Patented Aug. 14, 1945

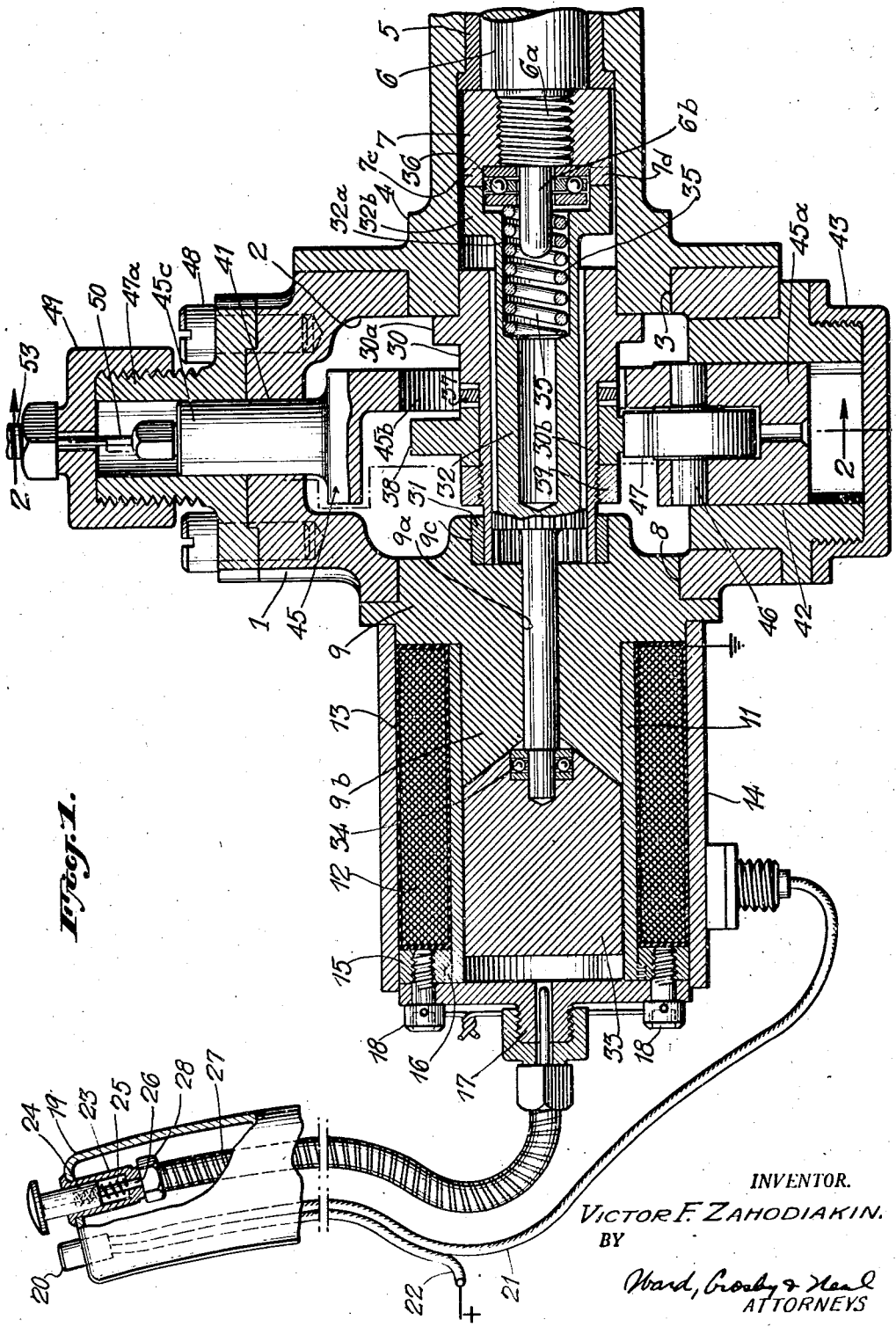

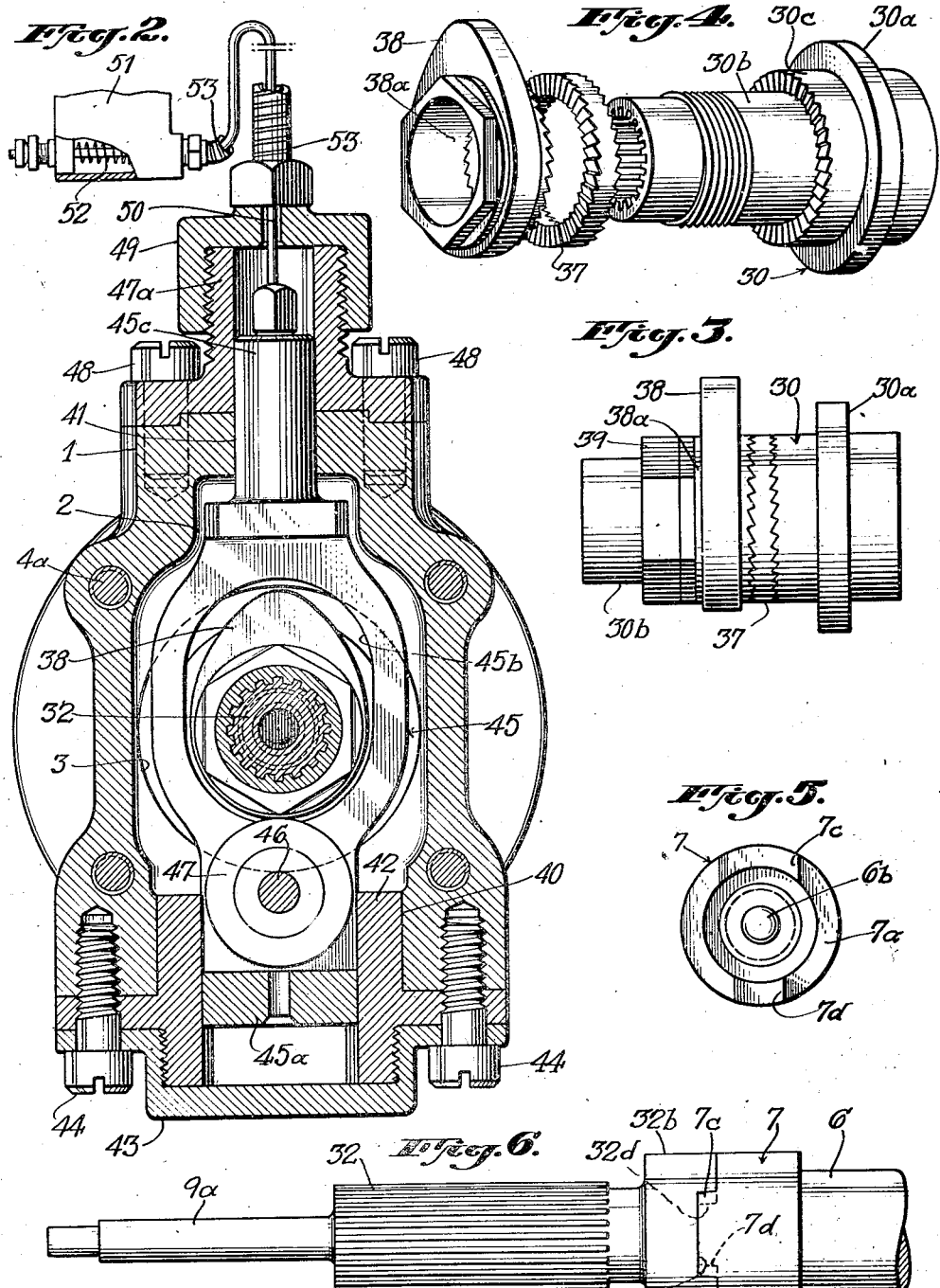

2,382,765

UNITED STATES PATENT OFFICE 2,382,765

CONTROL MECHANISM

Victor F. Zahodiakin, Short Hills, N. J.

Application August 15, 1942, Serial No. 454,908

6 Claims. (Cl. 192—67)

My invention relates to control mechanism of the type comprising a cam for periodically actuating a cam follower which, in the same periodic manner, actuates a suitable control member such, for example, as the member which effects the firing operation of a machine gun or the like.

My invention, in one important aspect thereof, relates to mechanism of the character described wherein a tubular cam-carrying member is mounted for rotatable movement about a fixed axis, said tubular member having a shaft disposed therein for longitudinal movement in opposite directions, said tubular member and said shaft being joined by a splined connection whereby rotatable movement of the shaft is imparted to said tubular member.

My invention, in another important aspect thereof, relates to mechanism for synchronizing the firing of a machine gun with an aircraft propeller, such mechanism being operable as desired by separate control systems.

Various other objects, advantages and features of my invention will become apparent from the following detailed description.

My invention resides in the control mechanism, cam-carrying and cam-actuating mechanism, features and combinations of the character hereinafter described and claimed.

For an understanding of my invention and for an illustration of one of the forms thereof, reference is to be had to the accompanying drawings, in which:

Figure 1 is a longitudinal, vertical sectional view, partly in elevation, showing the control mechanism of my invention;

Fig. 2 is a transverse, vertical sectional view, partly in elevation, taken on the line 2—2 of Fig. 1 looking in the direction of the arrows;

Fig. 3 is an elevational view showing some of the parts of my novel control mechanism disposed in assembled relation;

Fig. 4 is a perspective view showing the arrangement of Fig. 3 with the parts in dis-assembled relation;

Fig. 5 is an end elevational view showing the end of a power-applying shaft; and Fig. 6 is a side elevational view showing the shaft of Fig. 5 associated with the splined shaft of my invention.

In one of its important aspects, my invention relates to a control mechanism utilizable for synchronizing with an aircraft propeller the firing operation of a machine gun, a gun of other desired type, or other suitable projecting device, such guns or projecting device being hereinafter generically termed a "machine gun." In a more general aspect, my invention relates to control mechanism comprising an actuating cam and an actuated cam follower which delivers energy impulses to any selected member or equivalent having any desired control, indicating or other operative function.

Referring to Figs. 1 and 2, I have illustrated a housing 1 which defines an interior chamber 2, the housing 1, in the vertical side wall thereof toward the right, Fig. 1, being provided with a circular opening 3 which communicates with said chamber 2. In alinement with the opening 3, a head or cap 4 is secured exteriorly to said vertical side wall by screws or studs 4a. This head 4 is provided with a central passage in which is disposed a sleeve 5 fixed to the head 4 in suitable manner. The sleeve 5 supports a shaft 6 which terminates in an inner threaded section 6a and an outer non-threaded section 6b, the shaft sections 6a and 6b having reduced diameter as shown.

The aforesaid section 6a of the shaft 6 has a clutch ring 7 threaded thereto, the flat side of this ring at the right, Fig. 1, engaging the flanged end of said shaft 6 and the adjacent alined surface of the sleeve 5. With an arrangement of this character, the clutch ring 7 is secured to the shaft 6 for rotatable movement therewith as a unit. As shown in Figs. 1, 5 and 6, the clutch ring 7, beyond the threaded shaft section 6a, is formed with vertically alined, spaced lugs 7c and 7d, Fig. 5, the upper lug 7c having greater width than the lower lug 7d for a purpose hereinafter to be described.

The vertical side wall of the housing 1 toward the left, Fig. 1 is provided with a circular opening 8 which is horizontally alined with the aforesaid housing opening 3. A solenoid or electromagnetic pole structure 9 formed from suitable magnetic material is secured exteriorly to said last named side wall in alinement with and closing the opening 8 by suitable screws or the like, not shown. The pole structure is provided centrally thereof with a passage 9a which extends horizontally therethrough, the passage 9a being utilizable as hereinafter described.

The pole structure 9 comprises a longitudinally extending section 9b of reduced diameter to which a sleeve 11 is suitably secured, as by a press-fitting operation. The sleeve 11 has a solenoid coil or winding 12 wound or disposed thereon in any other suitable manner, the coil 12 being enclosed by electricity-insulating members 13 as shown. The coil 12 is housed by a cylindrical shell 14 which, at one end, rests upon the pole structure 9. The ends of the sleeve 11 and the shell 14 toward the left, Fig. 1, terminate substantially in the same vertical plane whereas the adjacent end of the coil 12 terminates short of this plane. The resulting space is filled by a ring 15 which, preferably, is welded to the aforesaid sleeve 11 as indicated at 16. The flange of a threaded nozzle 17 is held flatwise against the ring 15 by a plurality of screws 18 which pass through said flange and are threaded into said ring 15.

Carried by the control stick handle 19 is a suitable switch 20 which, by the application of thumb or finger pressure, is adapted to close the circuit of a pair of conductors 21 and 22, the conductor 21 being connected, in electricity-insulating relation, with one terminal of the coil 12, the other terminal of which is grounded onto the metallic shell 14 and the conductor 22 being suitably connected to said shell 14.

As shown in Fig. 1, the handle 19 carries a cylindrical sleeve or bushing 23 in which is disposed a plunger 24 biased in an upper direction by a helical spring 25 disposed around one end section of a flexible wire 26 movable in a cable 27, the other end section of the wire 26 projecting from said cable 27 and extending through a passage formed in a cap member 28 threaded to the aforesaid nozzle 17, said wire 26 terminating, preferably, in the passage formed in said nozzle 17. As shown, the opposite ends of the cable 27 are secured, respectively, to the cap member 28 and to the sleeve or bushing 23. As will be understood, the arrangement last described constitutes a Bowden wire device as known in the art.

In accordance with the invention, a cam-carrying tubular member 30 is journaled for rotatable movement in the chamber 2 of the housing 1. In the form of the invention shown, the head 4 and the pole structure 9 thus serve for rotatably supporting the tubular member 30. To this end and as illustrated, the pole structure 9, concentrically with respect to its passage 9a, is shaped to form a circular recess 9c which receives and rotatably supports a collar 31 secured to one end of the tubular member 30. The other end of the tubular member 30 is received in the above described central passage of the head 4, a flange 30a of said tubular member 30 coacting with the adjacent surface of the head 4 to limit movement of said tubular member 30 in a direction from left to right, Fig. 1. In this manner, the tubular member 30 is supported for free rotatable movement in the horizontal position shown in Fig. 1.

The passage of the tubular member 30 receives and supports a shaft 32 in freely slidable relation, the interior surface of the tubular member 30 and the exterior surface of the shaft 32 being provided with longitudinally extending grooves and ribs, alternately disposed, whereby said tubular member 30 and said shaft 32 are effectively splined to each other.

The end section of the shaft 32 toward the left, Fig. 1, extends freely through and is supported in the passage 9a of the pole structure 9 and the extreme end of said shaft 32 is connected to a solenoid core member 33 freely slidable in a chamber formed by a part of the aforesaid sleeve 11. As shown, an anti-friction thrust bearing 34 is disposed between a shouldered end of the shaft 32 and said core member 33.

The end section of the shaft 32 toward the right, Fig. 1, is shaped to form a longitudinally extending passage 32a and an enlarged collar section 32b, both being concentrically disposed with respect to the longitudinal axis of said shaft 32. The passage 32a of the shaft 32 receives a helical spring 35 disposed between a transverse surface of the shaft 32 and a thrust bearing 36 which engages surfaces of the above described clutch ring 7 and shaft 6. The shaft extension 6b extends through the thrust bearing 36 and terminates within the helical spring 35.

The collar section 32b of the shaft 32, which has the same diameter as the clutch ring 7, comprises vertically alined recesses 32c and 32d having peripheral length slightly greater than that of the respective clutch ring lugs 7c and 7d described above.

In accordance with the invention, the cam-carrying tubular member 30 comprises a section 30b of reduced diameter on which a clutch ring 37, the hub 38a of a cam 38 and a locking ring 39 are mounted. Opposite faces of the clutch ring 37 are serrated as indicated in Figs. 3 and 4. One set of these serrations cooperates with similar serrations formed on the face of a flange 30c of the tubular member 30. The other set of these serrations cooperates with similar serrations formed on the adjacent face of the cam hub 38a.

The tubular member 30 comprises a threaded section with which the locking ring 39 is associated, this locking ring 39, when threaded to its limit toward the right, Fig. 1, coacting with the cam hub 38a to hold the latter together with the clutch ring 37 in proper operative relation, that is, with the serrations on one face of the clutch ring 37 engaging the serrations on the flange 30c and with the serrations on the other face of said clutch ring 37 engaging the serrations on the cam hub 38a.

The hereinbefore described housing 1 has formed therein lower and upper passages 40 and 41 which are disposed in vertical alinement when the mechanism is positioned as shown in Fig. 1. The lower passage 40 has a sleeve 42 seated therein and the lower open end of this sleeve 42 is closed by a cap member 43, the sleeve and cap member being secured to the housing 1 by screws 44, or equivalent, Fig. 2.

The passage defined by the sleeve 42 receives, in freely slidable and non-rotatable relation, the non-circular base 45a of a cam follower 45, said base 45a supporting a pin 46 carrying a cam roller 47 with which the cam 38 is coactable in the manner hereinafter described.

The cam follower 45 comprises an intermediate section formed with an elliptical opening 45b or equivalent, Fig. 2, through which extends the aforesaid tubular member 30 and shaft 32, the opening 45b being of such size and shape as to prevent mechanical interference between the tubular member 30, the cam hub 38a together with the clutch ring 37 on the one hand and the cam follower 45 on the other hand during reciprocation of the latter.

The cam follower 45 further comprises an upper section 45c freely slidable in the upper passage 41 of the housing 1 and in the alined passage of a threaded nozzle 47a secured to said housing 1 by screws 48 or the like.

A cap member 49 secured to the nozzle 48 is provided with an opening through which extends a wire 50. One end of this wire 50 is connected to the cam follower 45 and the other end thereof is connected to a suitable trigger motor 51, for example, as known in the art of firing machine guns and comprising a helical spring 52 tending to draw the cam follower 45 in an upward direction, Figs. 1 and 2. As shown, the wire 50 may be enclosed by a suitable cable 53, Fig. 2.

In accordance with the invention, the hereinbefore described shaft 6 has connected thereto a shaft, not shown, which is rotated by the aircraft engine. After installation on an aircraft of a device of the character described, the shaft 6 should be operatively connected to the aircraft engine as described above and the wire 50 should be connected to the trigger motor 51. Thereupon, with the aircraft engine non-operative, the aircraft propeller is moved manually to the position which it is to occupy, approximately, when a bullet from the machine gun is to be fired between the propeller blades, such movement of the aircraft propeller being accompanied, of course, by movement of the engine pistons, crank shaft and the herein described shaft 6. As hereinafter described, the bullet is fired when the high section of the cam 38 moves the cam follower 45 downwardly, Figs. 1 and 2, against the action of the trigger motor spring 52.

After the aircraft propeller has been moved to the position described above and while it remains stationary, the screws or studs which retain the pole structure 9 on the housing 1 are removed whereupon the entire solenoid structure is removed as a unit from the casing 1, the tubular member 30 and the shaft 32. Thereupon, the shaft 32 is moved longitudinally to cause the clutch ring lugs 7c, 7d to be disposed within the respective clutch recesses 32c, 32d. While the shaft 32 is thus positioned, the locking ring 39 is retracted on the tubular member 30 and the cam 38 moved rotatably on the section 30b of the tubular member 30 to such position that the high section of said cam 38 assumes its lowermost position to thereby hold the cam follower 45 in its lowermost position whereby the trigger motor spring 52 is compressed to its maximum extent, this being necessary, as known in the art, to cause the machine gun to be fired. Thereupon, the locking ring 39 is moved to the position shown in Fig. 1 to thereby positively retain the cam 38 in its selected position. The clutch ring 37, the opposite sets of teeth of which are staggered, serves, in the described positioning of the cam 38, to introduce a "fineness" of adjustment otherwise not obtainable.

During flight of the aircraft and while the machine gun is non-operative, the shaft 32 is held by the spring 35 in its extreme position toward the left, Fig. 1, whereby the clutch face of said shaft 32 is disengaged from the clutch face of the ring 7. Accordingly, when the shaft 32 is positioned longitudinally as last described, the shaft 6 rotates freely but this rotation is without effect on the shaft 32 which remains stationary at this time.

When it becomes desirable or necessary to operate the machine gun, the circuit through the solenoid winding is closed at the switch 20 whereby the core member 33 is moved from left to right, Fig. 1, to the position shown to thereby move the shaft 32 in the same direction and effect engagement of the clutch face at the end thereof with the clutch face on the ring 7, the core member 33 being magnetically held against the pole structure 9 and, hence, remaining stationary, when positioned as last described, during continuous rotation of the shaft 32. By this action, the shaft 32 is connected to the constantly rotating shaft 6 and is rotated thereby at the same speed as said shaft 6. As described, the tubular member 30 is splined to the shaft 32 and, therefore, said tubular member 30 and the shaft 32 rotate together as a unit. The cam 38, which is carried by the tubular member 30, once for each revolution of said unit, engages the cam roller 47 to thereby move the cam follower 45 downwardly and effect the firing operation by actuation of the known member in the trigger motor 51.

When operation of the machine gun is to be discontinued, the switch 20 is released to thereby deenergize the solenoid winding whereupon, by action of the spring 35, the shaft 32 is moved longitudinally from right to left, Fig. 1, to disengage the clutch face at the end thereof from the clutch face on the ring 7. Thereafter, while the solenoid winding remains deenergized, the shaft 32 together with the tubular member 30 remain stationary even though rotation of the shaft 6 continues so long as the aircraft motor continues to operate.

An important feature of the invention relates to the arrangement comprising the tubular member 30, the shaft 32 which is splined thereto and the associated parts. The trigger motor spring 52 holds the cam follower roller 47 constantly in engagement with the cam 38. At all times, therefore, lateral force is applied to the tubular member 30 by said spring 52. By reason of the fact that the tubular member 30 is journaled in bearings formed by the head 4 and the pole structure 9, such lateral force is dissipated in said bearings and is not applied to the shaft 32. The tubular member 30, then, shields the shaft 32 from the lateral force of the trigger motor spring 52 and, accordingly, said shaft 32 is freely movable in a longitudinal manner either under control of the electro-magnet or the spring 35. At the same time, by virtue of the splined connection between the tubular member 30 and the shaft 32, the latter serves its intended purpose of rotating the cam 38 to operate the trigger motor.

Accordingly, with an arrangement of the character described, the power of the solenoid winding 12 may be low compared with the solenoid power required by those prior art machine gun synchronizing devices wherein the force of the trigger motor spring is applied constantly to the cam shaft of the synchronizing mechanism. With the mechanism of my invention, by reason of the fact that the force of the trigger motor spring 52 is not applied to the shaft 32, it follows that energization of the solenoid winding 12 initiates firing of the machine gun instantly, positively and in a trouble-free manner. Further, particularly by reason of the low power required for operating purposes, the mechanism as a whole may be small and compact. Still further, by reason of the low power requirements, it becomes practical to utilize the supplementary manual operating device as disclosed in the event of failure of the electrical control for the solenoid winding 12. Thus, should there be failure of the electrical control system, the plunger 24 may be depressed to thereby move the wire 26 into engagement with the core member 33 whereby force is applied to said core member 33 and to the shaft 32 to move the latter from left to right, Fig. 1, and cause engagement thereof with the rotating clutch ring 7.

From the foregoing description, it will be understood that, whenever the clutch is engaged, the same relation always obtains between the shafts 6 and 32. In other words, there is but one relative position of said shafts with respect to each other in which the clutch will engage. This is desirable because contributing to the exactness of the synchronizing operation.

The anti-friction thrust bearings 34 and 36 cooperate at the respective ends of the shaft 32 to reduce friction, the thrust bearing 34 operating, during rotation of said shaft 32, to decrease friction between the end of the shaft and the stationary core member 33 and the thrust bearing 34 cooperating with the spring 35 for a similar purpose.

As pointed out above, the shaft 32 operates without having lateral force applied thereto and, therefore, when moved from left to right, Fig. 1, there is little shock or impact between the clutch faces when they engage.

A major advantage of the invention resides in the fact that the tubular member 30 and shaft 32 rotate only during continuance of the firing operation. Compared to those prior art devices wherein the cam shaft rotates continuously, the mechanism of my invention is advantageous because decreasing bearing wear as well as wear on the cooperative cam surfaces.

The mechanism of my invention is free from shims, eccentrics and the like as ordinarily used for adjusting purposes in prior art devices. Excepting the adjustment of the operating cam circumferentially of the tubular member 30, no other adjustments are required with respect to my novel mechanism which, therefore, is well adapted for installation and care by unskilled labor.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

This application is a continuation-in-part of my co-pending application Serial No. 433,363, filed March 4, 1942.

What is claimed as new and desired to be secured by Letters Patent is:

1. In mechanism of the character described, a housing having alined openings, a head closing one of said openings, an electro-magnetic pole structure closing the other of said openings, a tubular member journaled for rotatable movement in said head and said pole structure, a shaft slidably disposed within said tubular member, said shaft for all positions thereof being arranged in power-transferring relation with respect to said tubular member, one end of said shaft being journaled in said pole structure and the other end thereof terminating in a clutch face disposed in a passage formed in said head, a shaft adapted to rotate constantly and having a clutch face disposed in said passage adjacent said first named clutch face, means comprising said pole structure for moving said first named shaft in one direction to connect said clutch faces, and means for moving said first named shaft longitudinally in reverse direction to disconnect it from said rotating means.

2. The combination of a drive shaft, a driven shaft mounted in alignment therewith for both rotary and endwise movement, the driven shaft having a recess in its end adjacent the drive shaft, means on the shafts brought into action when the driven shaft is moved endwise in one direction to connect the shafts together, a bearing within the recess having one element seated against the drive shaft, a spring within the recess bearing against the other element of the bearing and acting on the driven shaft to move it in one direction, and a solenoid having a core connected operatively to the driven shaft, the solenoid being effective upon energization to move the core and the driven shaft against the action of the spring.

3. The combination of a drive shaft, a driven shaft mounted in alignment therewith for both rotary and endwise movement. The driven shaft having a recess in its end adjacent the drive shaft, means on the shafts brought into action when the driven shaft is moved endwise in one direction to connect the shafts together, a bearing within the recess having one element seated against the drive shaft, a spring within the recess bearing against the other element of the bearing and acting on the driven shaft to move it in one direction, and a solenoid having a pole structure through which the driven shaft extends and also having a core with a recess in which a part of the driven shaft is received, the solenoid being effective upon energization to move the core and the driven shaft endwise against the action of the spring.

4. In mechanism of the character described, the combination of a drive shaft, a tubular member in alignment with the drive shaft, bearings in which the member is mounted for rotation, a driven shaft mounted within and extending through the tubular member and freely movable endwise therein, means connecting the member and driven shaft for rotation in unison in any longitudinal position of the driven shaft, means on the shafts operable to connect them when the driven shaft is in one longitudinal position, a spring acting on the shafts and biasing the driven shaft endwise in one direction, and a solenoid operable to move the driven shaft endwise in the other direction.

5. In mechanism of the character described, the combination of a drive shaft, a tubular member in alignment with the drive shaft, bearings in which the member is mounted for rotation, a driven shaft mounted within and extending through the tubular member and freely movable endwise therein, means connecting the member and driven shaft for rotation in unison in any longitudinal position of the driven shaft, means on the shafts operable to connect them when the driven shaft is in one longitudinal position, a spring acting on the shafts and biasing the driven shaft endwise in one direction, a solenoid having a pole structure with a passage through which the driven shaft extends, and a core within the solenoid having a recess containing a thrust bearing, the driven shaft having a portion seated on the thrust bearing and the solenoid being operable to move the core and driven shaft endwise in the other direction.

6. In mechanism of the character described, the combination of a drive shaft, a tubular member in alignment with the drive shaft, bearings in which the member is mounted for rotation, a driven shaft mounted within and extending through the tubular member and freely movable endwise therein, means connecting the member and driven shaft for rotation in unison in any longitudinal position of the driven shaft, means on the shafts operable to connect them when the driven shaft is in one longitudinal position, a spring acting on the shafts and biasing the driven shaft endwise in one direction, a solenoid having a core with which a portion of the driven shaft is operatively connected, the solenoid being operable to move the driven shaft endwise in the other direction, and manual means operable to apply force through the core to the driven shaft to move it endwise in said other direction.

VICTOR F. ZAHODIAKIN.